US010387838B2

United States Patent

(12) United States Patent
Bevis et al.

(10) Patent No.: US 10,387,838 B2
(45) Date of Patent: Aug. 20, 2019

(54) COURSE INGESTION AND RECOMMENDATION

(71) Applicant: Microsoft Technology Licensing, LLC, Redmond, WA (US)

(72) Inventors: Kevin Matthew Bevis, Mountain View, CA (US); Sachin Rajendra, Bangalore (IN); Anurag Chaudhry, San Jose, CA (US); Songzhe Cheng, Milpitas, CA (US); Anirban Mitra, Kolkata (IN); Kathy Hwang, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 188 days.

(21) Appl. No.: 15/141,631

(22) Filed: Apr. 28, 2016

(65) Prior Publication Data

US 2017/0318073 A1 Nov. 2, 2017

(51) Int. Cl.

| | |
|---|---|
| ***G06Q 10/10*** | (2012.01) |
| ***G06F 16/9535*** | (2019.01) |
| ***G06Q 30/02*** | (2012.01) |
| ***G06Q 50/20*** | (2012.01) |
| ***H04L 29/08*** | (2006.01) |
| ***H04L 12/58*** | (2006.01) |

(52) U.S. Cl.

CPC ....... *G06Q 10/105* (2013.01); *G06F 16/9535* (2019.01); *G06Q 10/10* (2013.01); *G06Q 30/02* (2013.01); *G06Q 50/205* (2013.01); *H04L 51/18* (2013.01); *H04L 67/02* (2013.01); *H04L 67/306* (2013.01)

(58) Field of Classification Search

CPC ....... H04L 67/02; H04L 67/306; H04L 51/18; G06F 17/3053; G06F 17/30867; G06F 17/3097; G06Q 10/105; G06Q 10/10; G06Q 30/02; G06Q 50/2057

See application file for complete search history.

(56) References Cited

U.S. PATENT DOCUMENTS

| | | | | |
|---|---|---|---|---|
| 2014/0164274 A1* | 6/2014 | Mai | ........................ | G06Q 10/10 705/327 |
| 2016/0260064 A1* | 9/2016 | Ahmed | ................ | H04L 67/306 |

* cited by examiner

*Primary Examiner* — Nam T Tran

(74) *Attorney, Agent, or Firm* — Schwegman Lundberg & Woessner, P.A.

(57) ABSTRACT

A system, a machine-readable storage medium storing instructions, and a computer-implemented method are described herein are directed to a Course Ingestion Engine (hereinafter "C.I. Engine") that extracts a least a portion of a word present in a course description of an online course. The C.I. Engine determines, based on the at least one extracted portion of the word, at least one skill defined in a social networking service that can be acquired from content of the online course. The C.I. Engine recommends the online course to a target member account of the social networking service.

12 Claims, 8 Drawing Sheets

COURSE INGESTION AND RECOMMENDATION

TECHNICAL FIELD

The present disclosure generally relates to data processing systems. More specifically, the present disclosure relates to methods, systems and computer program products for identifying one or more skills that correspond with a course description of an online course.

BACKGROUND

A social networking service is a computer- or web-based application that enables users to establish links or connections with persons for the purpose of sharing information with one another. Some social networking services aim to enable friends and family to communicate with one another, while others are specifically directed to business users with a goal of enabling the sharing of business information. For purposes of the present disclosure, the terms "social network" and "social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks").

With many social networking services, members are prompted to provide a variety of personal information, which may be displayed in a member's personal web page. Such information is commonly referred to as personal profile information, or simply "profile information", and when shown collectively, it is commonly referred to as a member's profile. For example, with some of the many, social networking services in use today, the personal information that is commonly requested and displayed includes a member's age, gender, interests, contact information, home town, address, the name of the member's spouse and/or family members, and so forth. With certain social networking services, such as some business networking services, a member's personal information may include information commonly included in a professional resume or curriculum vitae, such as information about a person's education, employment history, skills, professional organizations, and so on. With some social networking services, a member's profile may be viewable to the public by default, or alternatively, the member may specify that only some portion of the profile is to be public by default. Accordingly, many social networking services serve as a sort of directory of people to be searched and browsed.

DESCRIPTION OF THE DRAWINGS

Some embodiments are illustrated by way of example and not limitation in the figures of the accompanying drawings in which.

DETAILED DESCIUPTION

Figure 1:
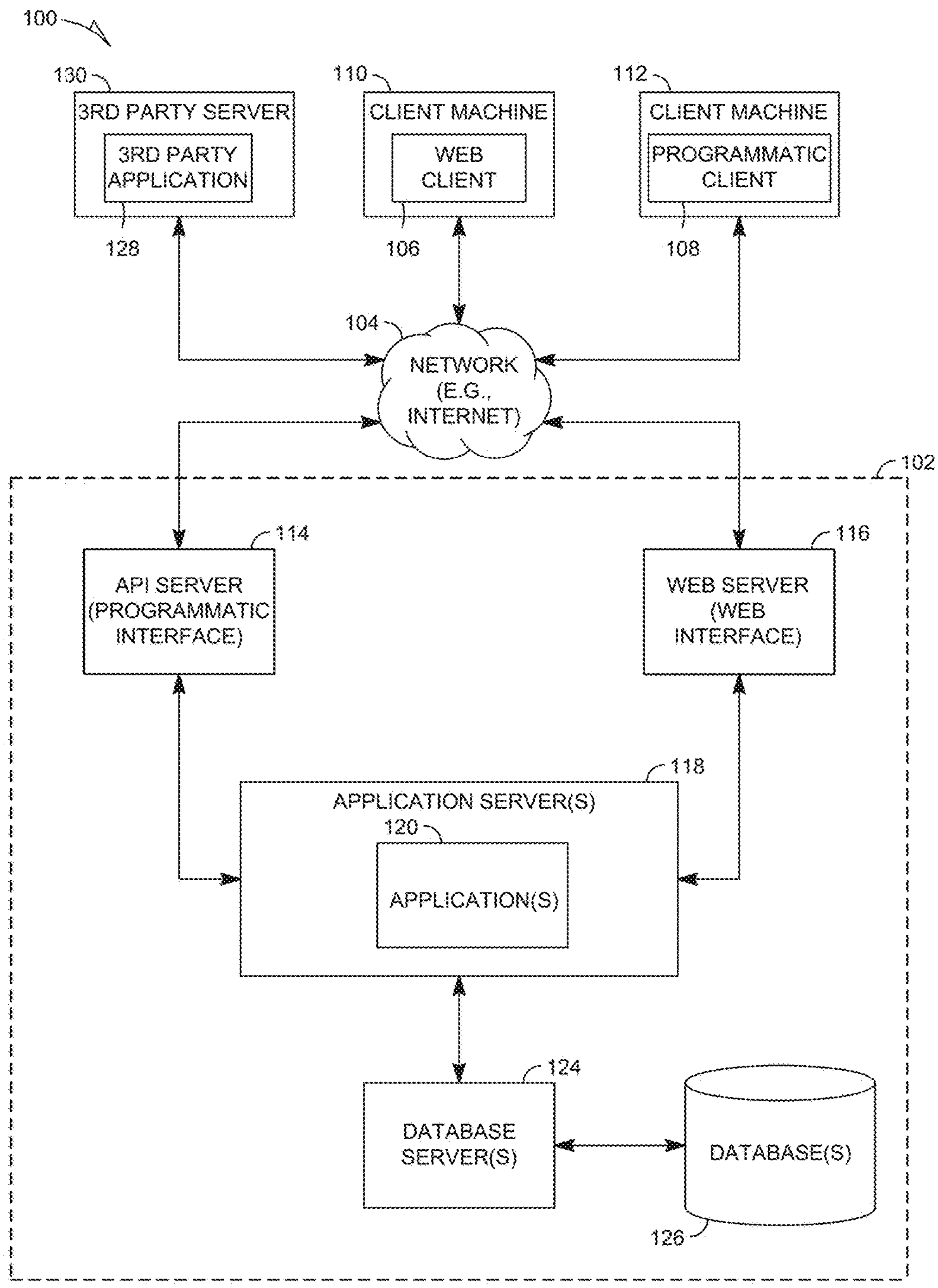
FIG. 1 is a block diagram illustrating a client-server system, in accordance with an example embodiment.

The present disclosure describes methods and systems for updating a target member account in a professional social networking service (which can also be referred to herein as a "professional social network" or "social network") based on a resource accessed by the target member account. In the following description, for purposes of explanation, numerous specific details are set forth in order to provide a thorough understanding of the various aspects of different embodiments of the present invention. It will be evident, however, to one skilled in the art, that the present invention may be practiced without all of the specific details.

A system, a machine-readable storage medium storing instructions, and a computer-implemented method are described herein are directed to a Course Ingestion Engine (hereinafter "C.I. Engine") that extracts a least a portion of a word present in a course description of an online course. The C.I. Engine determines, based on the at least one extracted portion of the word, at least one skill defined in a social networking service that can be acquired from content of the online course. The C.I. Engine recommends the online course to a target member account of the social networking service.

The C.I. Engine scans a description of an online course in order to infer which skills can be obtained by completing content of the online course. Such inferred skills are compared to and resolved against standardized Skills tags that originated from a member account(s) and are presently used in a threshold number of respective profiles of member accounts in the social networking service. The C.I. Engine therefore determines which skills—as they are defined within the social networking service—can be obtained by completing a particular online course based on text from respective pre-defined sections of the description of the particular online course.

According to an example embodiment, the C.I. Engine extracts words and phrases from a description. A description can have a Title, a Category (i.e. course category) and a General Description section. The C.I. Engine compares the extracted words and phrases to a listing of skills in the social networking service. The C.I. Engine identifies matches between respective skills in the listing of skills and the extracted words and phrases. Such matched skills from the listing of skills are indicative of a skill(s) that can be acquired by a user associated with a member account in the social networking service. In another embodiment, the listing of skills can be a dynamically-changing list of Skills based on skill tags generated by respective member accounts of the social networking service.

The C.I. Engine ranks the matched skills based on calculating a skill score for each matched skill. A skill score is based at least on how often the extracted words and phrases presently occur in the online course description. The C.I. Engine also prioritizes which section of the online course description extracted words and phrases are found. For example, if a first word (or first phrase) is extracted from a Title section of the online course description, a Title weight coefficient will be utilized when calculating a first skill score for the matched skill that corresponds to the first word (or first phrase). If a second word (or second phrase) is extracted from a Category section of the online course description (where the Category section describes a type of online class category), a Category weight coefficient will be utilized when calculating a second skill score for the matched skill that corresponds to the second word (or second phrase).

Each of the weight coefficients represent an importance of the Title section and the Category section, respectively. Specifically, in one embodiment, the Title weight coefficient is greater than Category weight coefficient such that the matched skill that corresponds with the first word (or first phrase) extracted from the Title section will most likely be ranked higher than the matched skill that corresponds with the second word (or second phrase) extracted from the Category section.

The C.I. Engine ranks all the calculated skill scores. The C.I. Engine selects a portion of the ranked list of skill scores. For example, the C.I. Engine selects the top quarter scores of the ranked list of skill scores. It is understood that various embodiments are not limited to selection the top 25% of scores in the ranked list of skill scores. According to various non-limiting examples, the top 10% or the top 33% scores can be selected. Such selected skill scores represent the best matching skills from the listing of the skills with respect to the online course description. The C.I. Engine identifies resources within the social networking service that correspond with the best matching skills. For example, the C.I. Engine determines, through text extraction, a top-ranked skill is "Java Programming" that can be acquired by enrolling and completing the online course. The C.I. Engine identifies a "Java" topic webpage within the social networking service and inserts a selectable link for the online course in the "Java" topic page. When a target member account accesses the "Java" topic webpage during a session in the social network service, the selectable link to the online course will be included in presentation of the "Java" topic webpage to the target member account. The target member account can decide to enroll in the online course in order to obtain Java programming skills. The target member account can select the selectable link in order to access the online course.

Turning now to FIG. 1, FIG. 1 is a block diagram illustrating a client-server system, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102. In some embodiments, the networked system 102 may comprise functional components of a professional social network.

Figure 2:
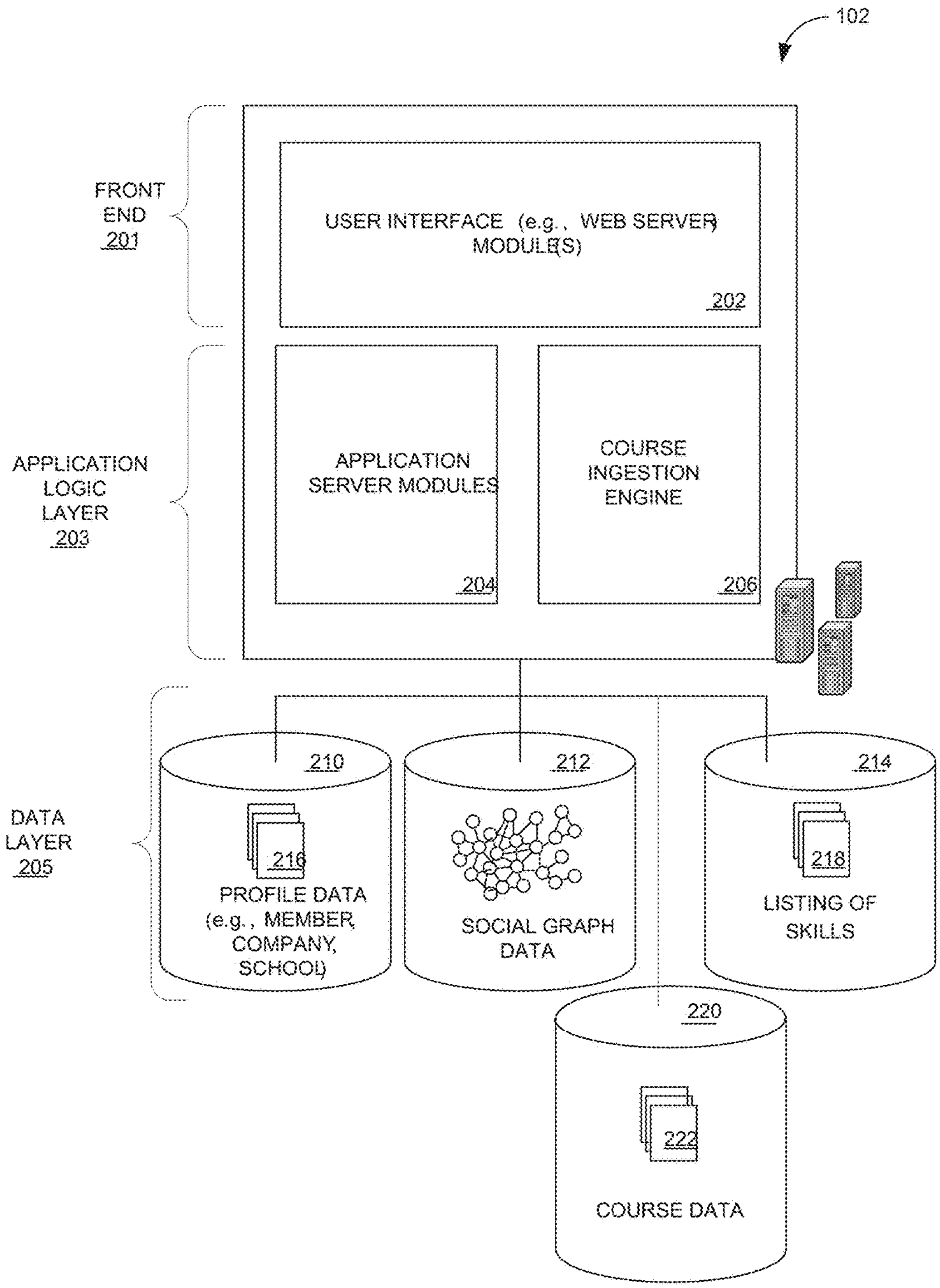
FIG. 2 is a block diagram showing functional components of a professional social network within a networked system, in accordance with an example embodiment.

FIG. 2 is a block diagram showing functional components of a professional social network within the networked system 102, in accordance with an example embodiment.

As shown in FIG. 2, the professional social network may be based on a three-tiered architecture, consisting of a front-end layer 201, an application logic layer 203, and a data layer 205. In some embodiments, the modules, systems, and/or engines shown in FIG. 2 represent a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 2. However, one skilled in the art will readily recognize that various additional functional modules and engines may be used with a professional social network, such as that illustrated in FIG. 2, to facilitate additional functionality that is not specifically described herein. Furthermore, the various functional modules and engines depicted in FIG. 2 may reside on a single server computer, or may be distributed across several server computers in various arrangements. Moreover, although a professional social network is depicted in FIG. 2 as a three-tiered architecture, the inventive subject matter is by no means limited to such architecture. It is contemplated that other types of architecture are within the scope of the present disclosure.

As shown in FIG. 2, in some embodiments, the front-end layer 201 comprises a user interface module (e.g., a web server) 202, which receives requests and inputs from various client-computing devices, and communicates appropriate responses to the requesting client devices. For example, the user interface module(s) 202 may receive requests in the form of Hypertext Transport Protocol (HTTP) requests, or other web-based, application programming interface (API) requests.

In some embodiments, the application logic layer 203 includes various application server modules 204, which, in conjunction with the user interface module(s) 202, generates various user interfaces (e.g., web pages) with data retrieved from various data sources in the data layer 205. In some embodiments, individual application server modules 204 are used to implement the functionality associated with various services and features of the professional social network. For instance, the ability of an organization to establish a presence in a social graph of the social network service, including the ability to establish a customized web page on behalf of an organization, and to publish messages or status updates on behalf of an organization, may be services implemented in independent application server modules 204. Similarly, a variety of other applications or services that are made available to members of the social network service may be embodied in their own application server modules 204.

As shown in FIG. 2, the data layer 205 may include several databases, such as a database 210 for storing profile data 216, including both member profile attribute data as well as profile attribute data for various organizations. Consistent with some embodiments, when a person initially registers to become a member of the professional social network, the person will be prompted to provide some profile attribute data such as, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information may be stored, for example, in the database 210. Similarly, when a representative of an organization initially registers the organization with the professional social network the representative may be prompted to provide certain information about the organization. This information may be stored, for example, in the database 210, or another database (not shown). With some embodiments, the profile data 216 may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or a seniority level within a particular company. With some embodiments, importing or otherwise accessing data from one or more externally hosted data sources may enhance profile data 216 for both members and organizations. For instance, with companies in particular, financial data may be imported from one or more external data sources, and made part of a company's profile.

The profile data 216 may also include information regarding settings for members of the professional social network. These settings may comprise various categories, including, but not limited to, privacy and communications. Each category may have its own set of settings that a member may control.

Once registered, a member may invite other members, or be invited by other members, to connect via the professional social network. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, may be stored and maintained as social graph data within a social graph database 212.

The professional social network may provide a broad range of other applications and services that allow members the opportunity to share and receive information, often customized to the interests of the member. For example, with some embodiments, the professional social network may include a photo sharing application that allows members to upload and share photos with other members. With some embodiments, members may be able to self-organize into groups, or interest groups, organized around a subject matter or topic of interest. With some embodiments, the professional social network may host various job listings providing details of job openings with various organizations.

In some embodiments, the professional social network provides an application programming interface (API) module via which third-party applications can access various services and data provided by the professional social network. For example, using an API, a third-party application may provide a user interface and logic that enables an authorized representative of an organization to publish messages from a third-party application to a content hosting platform of the professional social network that facilitates presentation of activity or content streams maintained and presented by the professional social network. Such third-party applications may be browser-based applications, or may be operating system-specific. In particular, some third-party applications may reside and execute on one or more mobile devices (e.g., a smartphone, or tablet computing devices) having a mobile operating system.

The data in the data layer 205 may be accessed, used, and adjusted by the C.I. Engine 206 as will be described in more detail below in conjunction with FIGS. 3-7. Although the C.I. Engine 206 is referred to herein as being used in the context of a professional social network, it is contemplated that it may also be employed in the context of any website or online services, including, but not limited to, content sharing sites (e.g., photo- or video-sharing sites) and any other online services that allow users to have a profile and present themselves or content to other users. Additionally, although features of the present disclosure are referred to herein as being used or presented in the context of a web page, it is contemplated that any user interface view (e.g., a user interface on a mobile device or on desktop software) is within the scope of the present disclosure.

As respective member accounts create descriptions of skills, with the various applications, services and content made available via the professional social network, a listing of skills 218 is updated and may be stored, for example, as indicated in FIG. 2, by the database 214. In one embodiment, a listing of skills is a dynamically updatable list of skills, where the skills are based on Skills descriptors generated by various member accounts in the professional social network. The data layer 205 further includes a database 214 that includes course data, such as one or more course descriptions, course titles, course category and other course-related information. It is understood that, in various embodiments, the C.I. Engine 206 is implemented by one or more application servers 118 as illustrated in FIG. 1.

Figure 3:
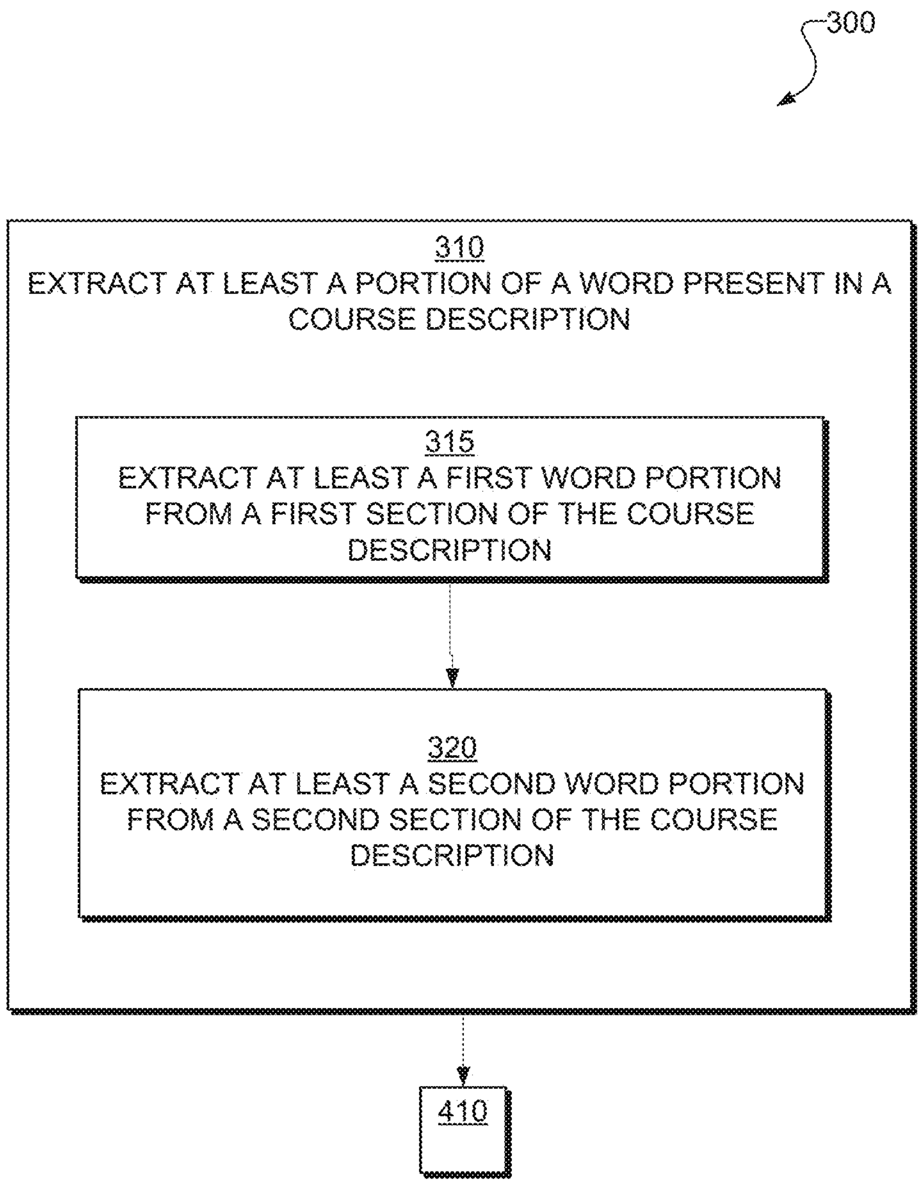
FIG. 3 is a flowchart illustrating a method of extracting at least one word from an online course description, according to embodiments described herein.

FIG. 3 is a flowchart 300 illustrating a method of extracting at least one word from an online course description, according to embodiments described herein.

At operation 310, C.I. Engine 206 extracts at least a portion of a word present in a description of an online course. The C.I. Engine 206 extracts multiple words and multiple phrases (combinations of words) from the description of the online course. In one example embodiment, the C.I. Engine 206 extracts a word from the description and determines a stem of the extracted word. For example, the C.I. Engine 206 extracts "management" and determines a stem as "manage."

In addition, during extraction, the C.I. Engine 206 compares each extracted word (or phrase) against a text database defined in the social networking service. If an extracted word (or phrase) does not match to any text in the text database, the C.I. Engine 206 discards that extracted word (or phrase).

At operation 315, the C.I. Engine 206 extracts at least a first word portion from a first section of the description of the online course. The description of the online course has a pre-defined format with a plurality of text sections. The C.I. Engine 206 extracts the words (and/or phrases) on a per-section basis. Some text sections are more important than others with respect to indicating what skills a participant of the online course attains upon completion of the online course. For example, the description of the online course has a Title section and a Category section and a General Description section. The C.I. Engine 206 extracts words and phrases from the Title section and determines whether any of the extracted words respectively match with any of the Skills defined in Skills listing of the social networking service.

At operation 330, the C.I. Engine 206 extracts at least a second word portion from a second section of the description of the online course. The C.I. Engine 206 extracts words and phrases from the Category section and determines whether any of the extracted words respectively match with any of the Skills defined in Skills listing of the social networking service. In one example embodiment, if the C.I. Engine 206 identifies matches between Skills and extracted words from at least one of the Title section and the Category section.

In addition to extraction from the Title section and Category section, the C.I. Engine 206 extracts various words and phrases from a General Description section of the description of the online course. In the General Description section, various extracted text that matches to Skills in the Skills listing may occur multiple times—whereas extracted text from the Title and Category sections will not appear multiple times since these sections tend to have a minimum amount of text. The C.I. Engine 206 tracks repeat instances of extracted text in the General Description. For example, if "programming" occurs three times in the General Description, the C.I. Engine 206 determines whether a stem of "programming" matches with a Skill in the Skills listing and counts each occurrence of "programming".

Figure 4:
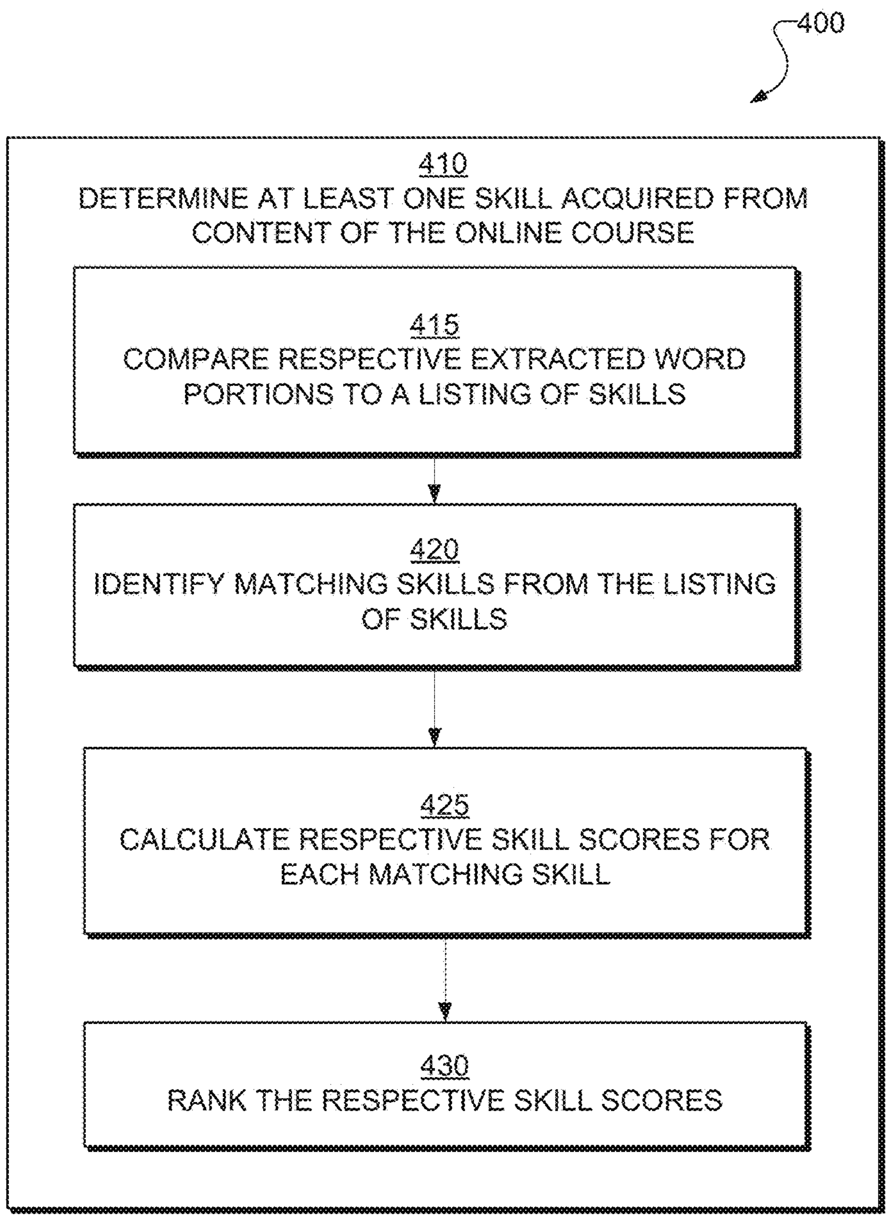
FIG. 4 is a flowchart illustrating a method of determining at least one skill acquired from content of the online course, according to embodiments described herein.

FIG. 4 is a flowchart 400 illustrating a method of determining at least one skill acquired from content of the online course, according to embodiments described herein.

At operation 410, the C.I. Engine 206 determines at least one skill acquired from content of the online course. In one example embodiment, the C.I. Engine 206 utilizes a listing of skills, which is a Skills list to determine the at least one skill acquired from the content of the online course.

The Skills list is a dynamically-growing list of Skill tags generated by a plurality of member accounts of the social networking service. For example, a member account customizes a Skill for a Skills section of their profile and the C.I. Engine creates a Skill tag based on the member account's newly-customized Skill. A customized Skill can be a portion of text describing a professional skill or ability to be appended to a Skills section of a member account profile. The new Skill tag is searchable on the social network service and other member accounts can select the Skill tag to populate a Skills section of their profile as well.

Upon determining that a threshold number of member accounts have selected the Skill tag for the Skills section of their respective member account profiles, the C.I. Engine 206 standardizes that Skill tag and inserts the Skill tag into the Skills list. For example, if a member account creates a Skill descriptor for the Skills section of their member account profile in the social network service for "business process intelligence," the C.I. Engine 206 will provide an option to other member account to include "business process intelligence" in their respective profiles in the social networking service. Once a threshold number of member accounts have inserted "business process intelligence" in their profile's Skills section, the C.I. Engine 206 creates a Skills tag for "business process intelligence" and inserts the new Skills tag in the Skills list.

The new Skills tag will also map to a Skills tag in the Skills listing for "business intelligence." For example, given the text of "business process intelligence", the C.I. Engine 206 extracts all N-grams up to size 6. For example, the N-grams are "business, business process, business process intelligence, process, process intelligence, and intelligence". The C.I. Engine 206 also has an additional dictionary that provides for pre-defined rules for mapping N-grains of a Skills tag to a related Skills tag. The C.I. Engine 206 utilizes the dictionary to map the N-gram of "business process" from "business process intelligence" to a related Skill of "business process management." Therefore, by extracting the text of "business process intelligence" from a section of an online course description, the C.I. Engine 206 determines whether any of N-grams matches to text in the Skills list and maps the matching N-gram, via the dictionary of pre-defined rules, to a related Skill. The C.I. Engine thereby determines that the online course description from which "business process intelligence" will provide the Skill of "business process management."

Use of the Skills list allows the C.I. Engine 206 to identify skills acquired from online courses based on skills identifiers that originated from member accounts. As such, the Skills list is a dynamically-growing listing of Skills tags, where the Skills tags are based on text generated from member accounts. In one embodiment, the C.I. Engine 206 dynamically updates the Skills list with a new Skills tag concurrently with determining a skill that corresponds with text extracted from a plurality of online course descriptions.

At operation 415, the C.I. Engine 206 compares the respective extracted word portions to a listing of skills. The C.I. Engine 206 compares extracted words to Skills tags in the Skills list. Such comparison occurs on a per-section basis. For example, the C.I. Engine 206 executes the comparison for extracted words from the Title section prior to comparing the extracted words from the Category section, or vice-versa.

At operation 420, the C.I. Engine 206 identifies matching skills from the listing of skills. In one example embodiment, the C.I. Engine 206 determines exact matches between the Skills tags in the Skills list and the extracted words. An exact match can occur as between a respective Skills tag and the extracted word or a stem portion of the extracted word. An exact match can occur as between a respective Skills tag and a portion of an extracted phrase. For example, if the extracted phrase is "business management," the C.I. Engine 206 identifies an exact match between "management" and a Skills tag that corresponds to "management."

At operation 425, the C.I. Engine 206 calculates respective skill scores for each matching skill. An explanation of skill score calculation if provided herein in connection with FIG. 5 below.

At operation 430, the C.I. Engine 206 ranks the respective skill scores. For example, the C.I. Engine 2016 generates a ranking of respective skill scores in an order from the largest skill scores down to the smallest skill scores.

Figure 5:
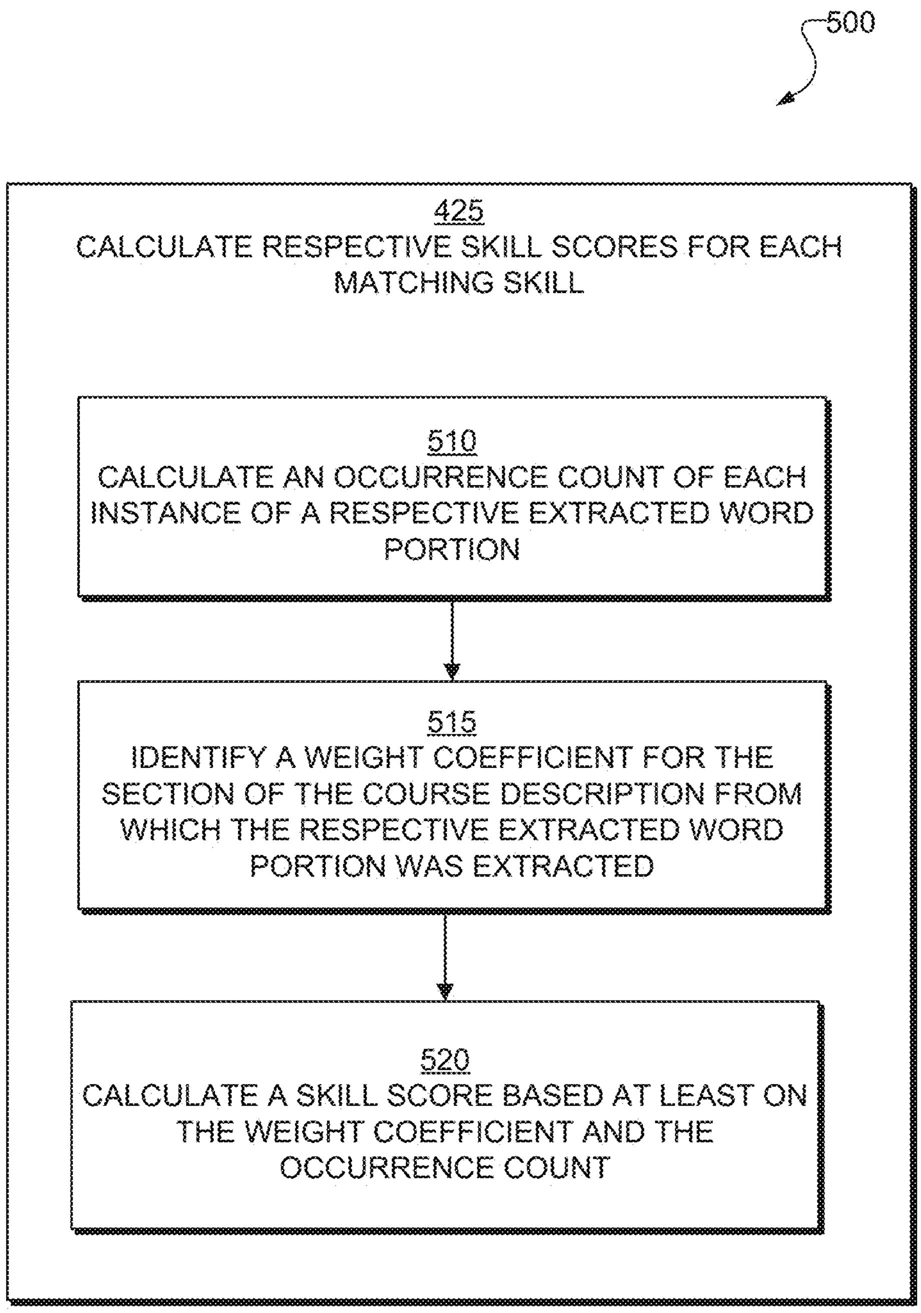
FIG. 5 is a flowchart illustrating a method of calculating at least one skill score, according to embodiments described herein.

FIG. 5 is a flowchart 500 illustrating a method of calculating at least one skill score, according to embodiments described herein.

At operation 510, the C.I. Engine 206 calculates an occurrence count based on each instance of a respective extracted word portion. For example, for a matched Skill tag for a word extracted from a General Description section of the online course description, the C.I. Engine 206 counts how many times that extracted word (or its stern) appears in the General Description section.

At operation 515, the C.I. Engine 206 identifies a weight coefficient for the section of the online course description from which the respective extracted word portion was extracted. Each section has an assigned pre-defined weight coefficient. For example, the Title section has a first pre-defined weight coefficient and the Category section has a second pre-defined weight coefficient. The first and second pre-defined weight coefficients are different than each other so as to reflect which section is given a higher priority.

At operation 520, the C.I. Engine 206 calculates a skill score based at least on the weight coefficient and the occurrence count. For each matching skill tag, the C.I. Engine 206 calculates a respective skill score using the section-specific weigh coefficient and how many times the corresponding extracted word appears in the section of the online course description from which it was extracted. The C.I. Engine 206 ranks the respective skill scores for all the matching Skills tags from the listing of skills.

Figure 6:
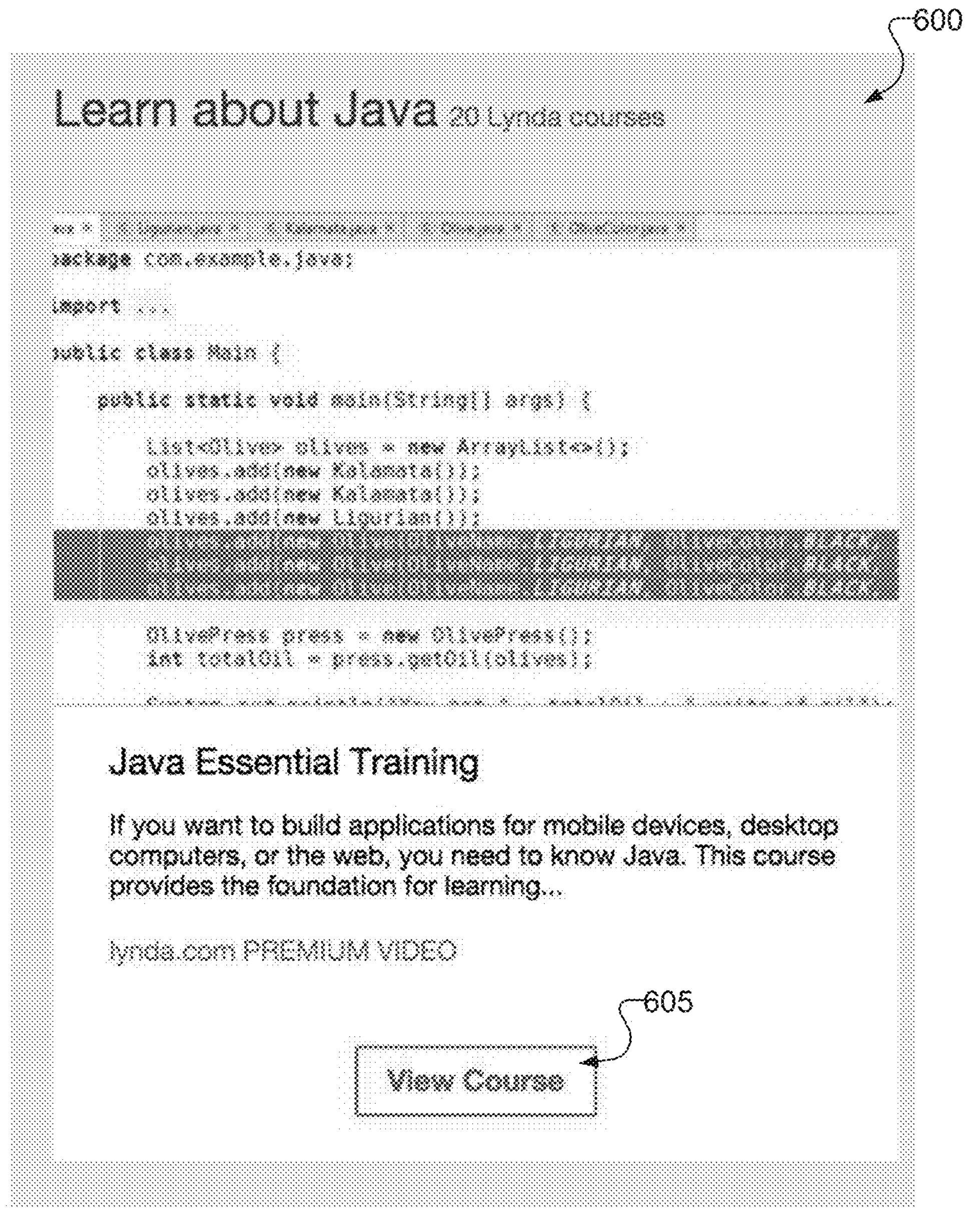
FIG. 6 is a diagram of a user interface that includes display of a social network resource that includes a link to an online course, according to embodiments described herein.

FIG. 6 is a diagram of a user interface 600 that includes display of a social network resource that includes a link to an online course, according to embodiments described herein.

The C.I. Engine 206 generates a description resource within the social networking service. For example, in one embodiment, the description resource is a topic description resource, which can be a portal within the social networking service to articles, jobs and expert profiles that correspond to a skill that matches a selected skill from the skills ranking. The topic description resource can have one or more Skills tags representative of skills that correspond with the topic.

The C.I. Engine 206 determines a match between a Skills tag of the topic description resource and a selected skill from the skills ranking. Based on the match, the C.I. Engine 206 includes a selectable link 605 to initiate enrolment in the online course in the topic description resource. In another embodiment, the description resource can be a job description resource for a job that requires the at least one skill acquired from content of the online course.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g.,a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 7:
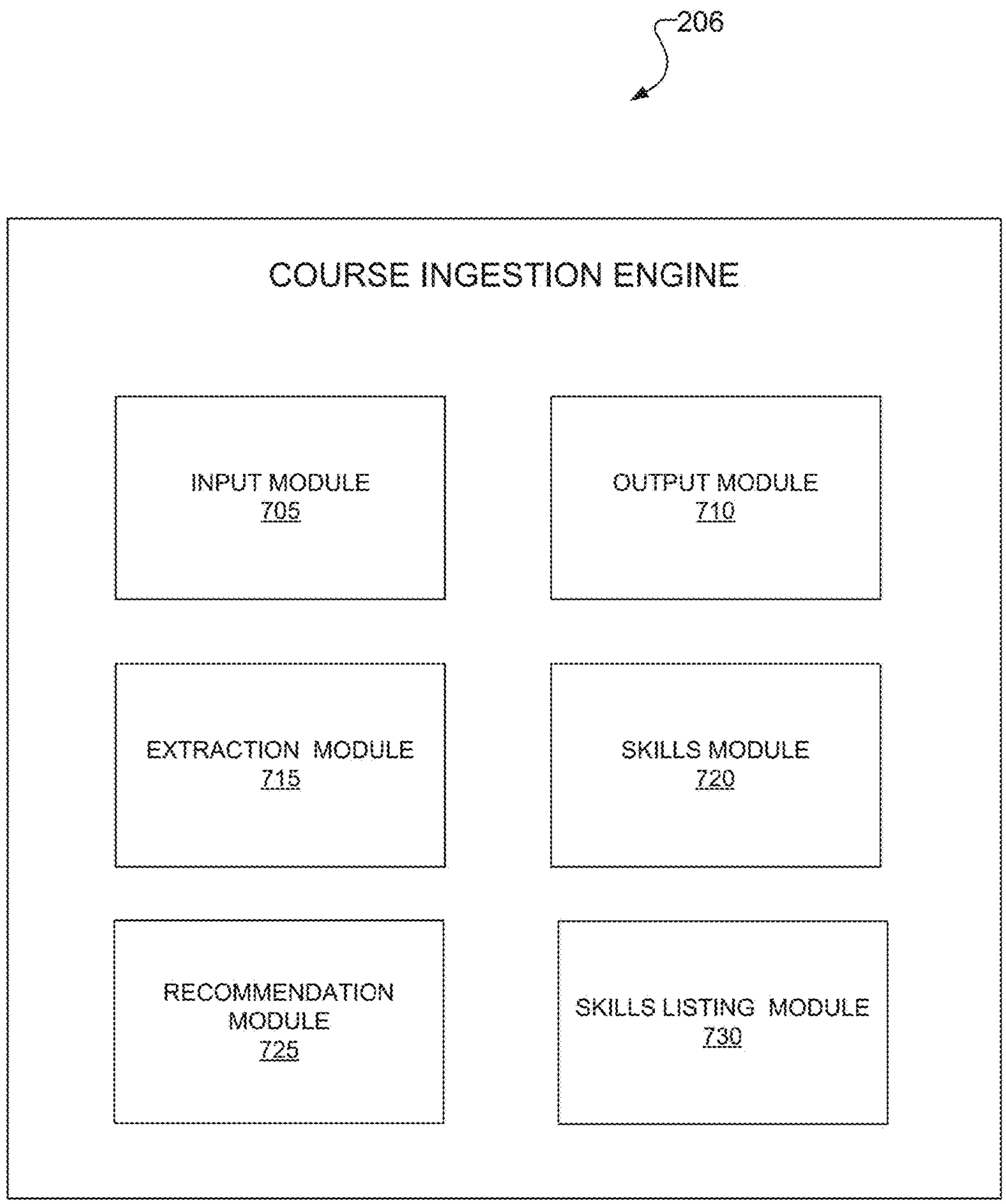
FIG. 7 is a block diagram showing example components of a Course Ingestion Engine, according to some embodiments.

FIG. 7 is a block diagram showing example components of a Course Ingestion Engine 206, according to some embodiments.

The input module 305 is a hardware-implemented module that controls, manages and stores information related to any inputs from one or more components of system 102 as illustrated in FIG. 1 and FIG. 2. In various embodiments, the inputs include one or more descriptions of online courses. Other inputs include skills generated by member accounts of the social networking service.

The output module 710 is a hardware-implemented module that controls, manages and stores information related to which sends any outputs to one or more components of system 100 of FIG. 1 (e.g., one or more client devices 110, 112, third party server 130, etc.). In some embodiments, the output is a ranking of skills based on text extracted from a description of an online course. Other outputs can be a particular Skills tag that matches a skill selected from the ranking of skills.

The extraction module 715 is a hardware implemented module which manages, controls, stores, and accesses information related to extraction words and phrases from respective pre-defined section of a plurality of online course descriptions.

The skills module 720 is a hardware-implemented module which manages, controls, stores, and accesses information related to determining skills defined in the social networking service that match with text extracted from the respective sections of an online course description. The skills module 720 further calculates skills scores for each matching skills and generates a skills ranking.

The recommendation module 725 is a hardware-implemented module which manages, controls, stores, and accesses information related to insert a selectable functionality to access an online course in one or more resources within the social networking service. For example, the recommendation module 725 includes the selectable functionality in a topic resource description. In another example, the recommendation module 725 includes the selectable functionality in a job resource description.

The skills listing module 730 is a hardware-implemented module which manages, controls, stores, and accesses information related to generating, updating and storing a listing of skills within the social networking service. In one embodiment, the listing of skills is a Skills list. The skills listing module 730 receives a Skill generated by respective member account in the social networking service. The skills listing module 730 provides the newly-generated Skill to be selected by a plurality of member accounts for inclusion in a Skills section of their profiles in the social networking service.

The skills listing module 730 detects a threshold number of member accounts have selected the newly-generated Skill for inclusion in their profiles. Based on satisfaction of the threshold number, the skills listing module 730 creates a Skills tag representative of the newly-generated Skill and updates the Skills list with the new Skills tag. It is understood that such updating of the Skills list with one or more Skills tags occurs concurrently with determining the skills provided by one or more online course descriptions.

Figure 8:
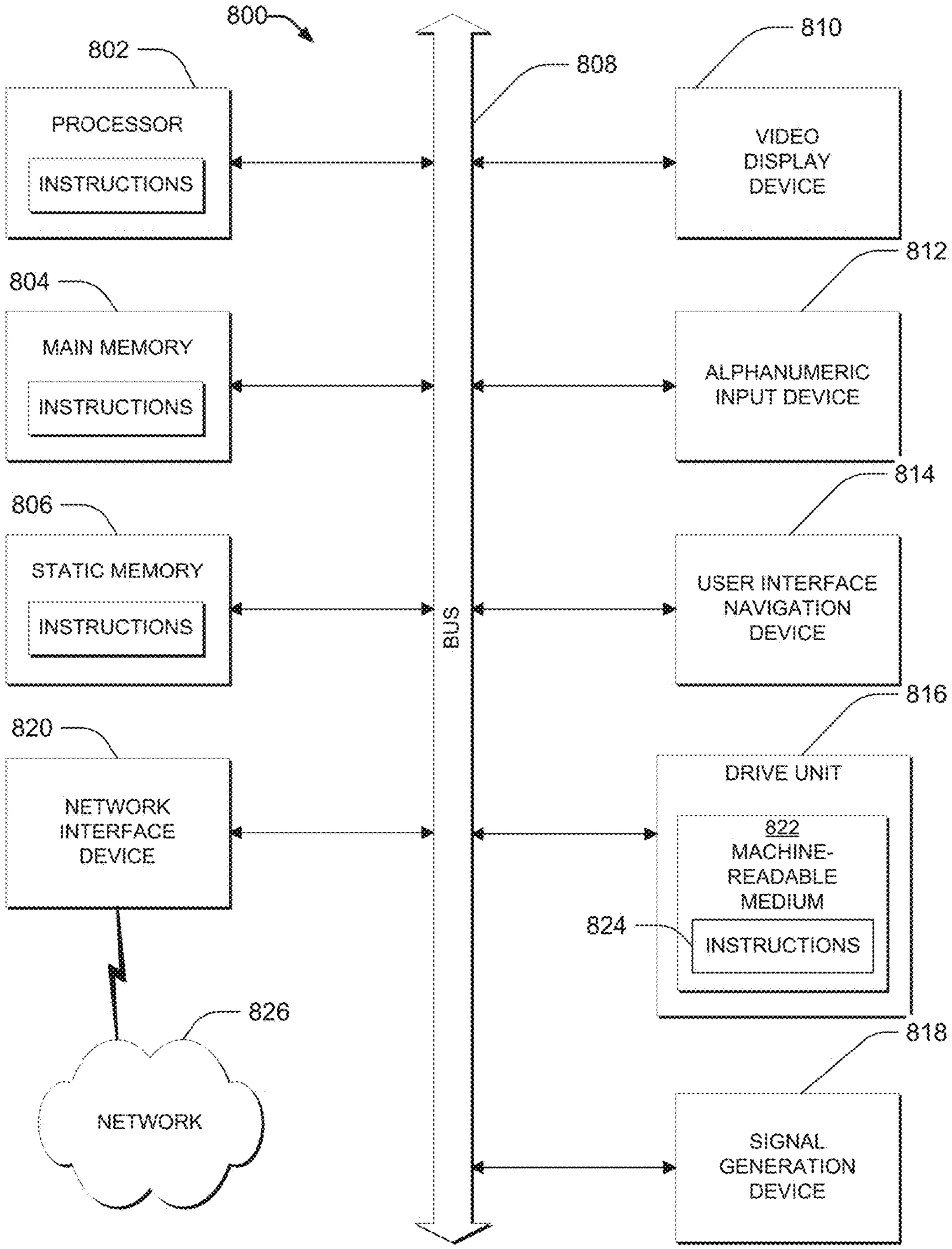
FIG. 8 is a block diagram of an example computer system on which methodologies described herein may be executed, in accordance with an example embodiment.

FIG. 8 is a block diagram of a machine in the example form of a computer system 800 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 800 includes a processor 802 (e.g., a central processing unit (CPU), a graphics processing unit (GPU) or both), a main memory 804, and a static memory 806, which communicate with each other via a bus 808. Computer system 800 may further include a video display device 810 (e.g., a liquid crystal display (LCD) or a cathode ray tube (CRT)). Computer system 800 also includes an alphanumeric input device 812 (e.g., a keyboard), a user interface (UI) navigation device 814 (e.g., a mouse or touch sensitive display), a disk drive unit 816, a signal generation device 818 (e.g., a speaker) and a network interface device 820.

Disk drive unit 816 includes a machine-readable medium 822 on which is stored one or more sets of instructions and data structures (e.g., software) 824 embodying or utilized by any one or more of the methodologies or functions described herein. Instructions 824 may also reside, completely or at least partially, within main memory 804, within static memory 806, and/or within processor 802 during execution thereof by computer system 800, main memory 804 and processor 802 also constituting machine-readable media.

While machine-readable medium 822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present technology, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Instructions 824 may further be transmitted or received over a communications network 826 using a transmission medium. Instructions 824 may be transmitted using network interface device 820 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the technology. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:

extracting a least a portion of a word present in a course description of an online course by extracting at least a first word portion from a pre-defined first section of the course description; and extracting at least a second word portion from a pre-defined second section of the course description;

based on the at least one extracted portion of the word, determining at least one skill defined in a social networking service that can be acquired from content of the online course by, at an application logic layer:

comparing the extracted first word portion and the extracted second word portion to a listing of skills;

identifying a first match between a first skill in the listing of skills and the extracted first word portion;

identifying a second match between a second skill in the listing of skills and the extracted second word portion;

calculating a respective skill score for each of the first match and the second match by:

calculating a first occurrence count based on each instance of the extracted first word portion present in the pre-defined first section;

identifying a first weight coefficient representing an importance of the pre-defined first section;

calculating a first skill score based at least on the first occurrence count and the first weight occurrence;

calculating a second occurrence count based on each instance of the extracted second word portion present in the pre-defined second section;

identifying a second weight coefficient representing an importance of the pre-defined second section; and calculating a second skill score based at least on the second occurrence count and the second weight occurrence; and ranking the respective skill scores; and generating a recommendation in a graphical user interface in a front-end layer based on the respective skill scores.

2. The computer-implemented method as in claim 1, wherein generating a recommendation comprises:

generating a description resource within the social networking service;

including a selectable link to the online course in the description resource;

receiving, during a session within the social networking service, a request from the target member account to access the description resource; and providing display data based on the description resource to the target member account during the session within the social networking service.

3. The computer-implemented method as in claim 2, wherein the description resource comprises:

a job description resource for a job that requires the at least one skill acquired from content of the online course.

4. The computer-implemented method as in claim 2, wherein the description resource comprises:

a topic description resource comprising a portal within the social networking service to at least one article that corresponds to a topic, at least one job that corresponds to the topic and at least one expert on the topic, wherein the topic further corresponds to the at least one skill acquired from content of the online course.

5. The computer-implemented method of claim 1, wherein the graphical user interface is displayed on a mobile device.

6. A non-transitory computer-readable medium storing executable instructions thereon, which, when executed by a processor, cause the processor to perform operations including:

extracting a least a portion of a word present in a course description of an online course by extracting at least a first word portion from a pre-defined first section of the course description; and extracting at least a second word portion from a pre-defined second section of the course description;

based on the at least one extracted portion of the word, determining at least one skill defined in a social networking service that can be acquired from content of the online course by, at an application logic layer:

comparing the extracted first word portion and the extracted second word portion to a listing of skills;

identifying a first match between a first skill in the listing of skills and the extracted first word portion;

identifying a second match between a second skill in the listing of skills and the extracted second word portion;

calculating a respective skill score for each of the first match and the second match by:

calculating a first occurrence count based on each instance of the extracted first word portion present in the pre-defined first section;

identifying a first weight coefficient representing an importance of the pre-defined first section;

calculating a first skill score based at least on the first occurrence count and the first weight occurrence;

calculating a second occurrence count based on each instance of the extracted second word portion present in the pre-defined second section;

identifying a second weight coefficient representing an importance of the pre-defined second section; and calculating a second skill score based at least on the second occurrence count and the second weight occurrence; and ranking the respective skill scores; and generating a recommendation in a graphical user interface in a front-end layer based on the respective skill scores.

7. The non-transitory computer-readable medium as in claim 6, wherein generating a recommendation comprises:

generating a description resource within the social networking service;

including a selectable link to the online course in the description resource;

receiving, during a session within the social networking service, a request from the target member account to access the description resource; and providing display data based on the description resource to the target member account during the session within the social networking service.

8. The non-transitory computer-readable medium as in claim 7, wherein the description resource comprises:

a job description resource for a job that requires the at least one skill acquired from content of the online course.

9. The non-transitory computer-readable medium as in claim 7, wherein the description resource comprises:

a topic description resource comprising a portal within the social networking service to at least one article that corresponds to a topic, at least one job that corresponds to the topic and at least one expert on the topic, wherein the topic further corresponds to the at least one skill acquired from content of the online course.

10. A computer system, comprising:

a processor;

a memory device holding at least one instruction set executable on the processor to cause the computer system to perform operations comprising:

extracting a least a portion of a word present in a course description of an online course by extracting at least a first word portion from a pre-defined first section of the course description; and extracting at least a second word portion from a pre-defined second section of the course description;

based on the at least one extracted portion of the word, determining at least one skill defined in a social networking service that can be acquired from content of the online course by, at an application logic layer:

comparing the extracted first word portion and the extracted second word portion to a listing of skills;

identifying a first match between a first skill in the listing of skills and the extracted first word portion;

identifying a second match between a second skill in the listing of skills and the extracted second word portion;

calculating a respective skill score for each of the first match and the second match by:

calculating a first occurrence count based on each instance of the extracted first word portion present in the pre-defined first section;

identifying a first weight coefficient representing an importance of the pre-defined first section;

calculating a first skill score based at least on the first occurrence count and the first weight occurrence;

calculating a second occurrence count based on each instance of the extracted second word portion present in the pre-defined second section;

identifying a second weight coefficient representing an importance of the pre-defined second section; and calculating a second skill score based at least on the second occurrence count and the second weight occurrence; and ranking the respective skill scores; and generating a recommendation in a graphical user interface in a front-end layer based on the respective skill scores.

11. The computer system as in claim 10, wherein generating a recommendation comprises:

generating a description resource within the social networking service;

including a selectable link to the online course in the description resource;

receiving, during a session within the social networking service, a request from the target member account to access the description resource; and providing display data based on the description resource to the target member account during the session within the social networking service.

12. The computer system as in claim 11, wherein the description resource comprises:

a job description resource for a job that requires the at least one skill acquired from content of the online course.

* * * * *